United States Patent
Rakshit et al.

(10) Patent No.: US 11,965,482 B2
(45) Date of Patent: Apr. 23, 2024

(54) MAXIMIZING SOLAR PANEL POWER GENERATION WITH MICRO WIND TURBINES

(71) Applicant: INTERNATIONAL BUSINESS MACHINES CORPORATION, Armonk, NY (US)

(72) Inventors: Sarbajit K. Rakshit, Kolkata (IN); Jagabondhu Hazra, Bangalore (IN); Manikandan Padmanaban, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 17/934,823

(22) Filed: Sep. 23, 2022

(65) Prior Publication Data
US 2024/0102446 A1   Mar. 28, 2024

(51) Int. Cl.
*F03D 7/02* (2006.01)
*F03D 9/00* (2016.01)
*H02S 20/32* (2014.01)

(52) U.S. Cl.
CPC .......... *F03D 7/0204* (2013.01); *F03D 9/007* (2013.01); *H02S 20/32* (2014.12)

(58) Field of Classification Search
CPC ......... F03D 7/0204; F03D 9/007; H02S 20/32
See application file for complete search history.

(56) References Cited

U.S. PATENT DOCUMENTS

| | | | | |
|---|---|---|---|---|
| 7,230,819 B2 * | 6/2007 | Muchow | ................ | F24S 25/70 361/825 |
| 8,330,296 B2 | 12/2012 | Ottman | | |
| 8,847,425 B2 * | 9/2014 | Jordan, Sr. | ................ | H02J 3/38 290/55 |
| 9,221,136 B2 * | 12/2015 | Ansari | .................... | B23P 19/04 |
| 9,228,370 B1 * | 1/2016 | Boniface | ................. | H02S 10/12 |
| 9,416,774 B2 * | 8/2016 | Jordan, Sr. | ............. | H02S 10/12 |

(Continued)

FOREIGN PATENT DOCUMENTS

| | | | | |
|---|---|---|---|---|
| CA | 2703468 A1 * | 8/2010 | ............. | F03D 9/007 |
| CN | 113389686 A * | 9/2021 | | |

(Continued)

OTHER PUBLICATIONS

"Micro turbine array usage in multiple applications", An IP.com Prior Art Database Technical Disclosure, Authors et al.: Disclosed Anonymously, IP.com No. IPCOM000205353D, IP.com Electronic Publication Date: Mar. 28, 2011, 7 pages.

(Continued)

*Primary Examiner* — Pedro J Cuevas
(74) *Attorney, Agent, or Firm* — Gilbert Harmon, Jr.

(57) ABSTRACT

An approach for adjusting the inclination of a solar panel and the pitch of one or more micro-turbines to maximize power output. The approach predicts wind velocity at a small opening of an inclined solar panel wherein a plurality of micro-turbines is located. The approach predicts solar irradiance striking the inclined solar panel. The approach calculates an optimal solar panel inclination angle and micro-turbine pitch based on maximizing power output. The approach adjusts the solar panel inclination angle and micro-turbine pitch based on the calculation.

20 Claims, 6 Drawing Sheets

(56) References Cited

U.S. PATENT DOCUMENTS

| | | | |
|---|---|---|---|
| 9,422,922 B2* | 8/2016 | Sant'Anselmo | H02J 3/38 |
| 9,562,518 B2* | 2/2017 | Patel | F03D 9/25 |
| 9,599,299 B2 | 3/2017 | Hoang | |
| 9,780,720 B2* | 10/2017 | Ansari | F03G 13/40 |
| 10,367,442 B2* | 7/2019 | Ansari | H02J 7/0042 |
| 10,852,037 B2* | 12/2020 | Sant'Anselmo | H02J 3/38 |
| 11,399,065 B1* | 7/2022 | Thirumurthy | H02J 13/00004 |
| 2004/0124711 A1* | 7/2004 | Muchow | F24S 25/10 |
| | | | 307/64 |
| 2008/0047270 A1* | 2/2008 | Gilbert | F03D 9/11 |
| | | | 60/641.12 |
| 2008/0068782 A1* | 3/2008 | Muchow | F24S 25/10 |
| | | | 307/64 |
| 2010/0207453 A1* | 8/2010 | Ottman | H02S 10/12 |
| | | | 307/72 |
| 2011/0089698 A1 | 4/2011 | Ahmadi | |
| 2012/0086214 A1* | 4/2012 | Roskey | F03D 1/04 |
| | | | 290/55 |
| 2014/0231284 A1* | 8/2014 | Ansari | E04H 1/1238 |
| | | | 29/428 |
| 2015/0308409 A1* | 10/2015 | Patel | F03D 7/06 |
| | | | 290/55 |
| 2016/0036375 A1* | 2/2016 | Ansari | F03G 6/001 |
| | | | 206/216 |
| 2018/0358919 A1* | 12/2018 | Ansari | H02J 7/35 |
| 2019/0326846 A1* | 10/2019 | Ansari | C02F 1/006 |
| 2020/0355158 A1* | 11/2020 | Cook | F03D 7/06 |

FOREIGN PATENT DOCUMENTS

| | | | | |
|---|---|---|---|---|
| CN | 116169943 A | * | 5/2023 | |
| KR | 101124172 B1 | | 2/2012 | |
| WO | 2018125252 A1 | | 7/2018 | |
| WO | WO-2020231737 A1 | * | 11/2020 | F03D 15/00 |
| WO | WO-2022093539 A1 | * | 5/2022 | B60L 53/51 |

OTHER PUBLICATIONS

Kuznetsov et al., "Parametric Optimization of Combined Wind-Solar Energy Power Plants for Sustainable Smart City Development", Applied Sciences, Published: Nov. 4, 2021, 14 pages.

Loganathan et al., "Design of a micro wind turbine and its economic feasibility study for residential power generation in built-up areas", 2nd International Conference on Energy and Power, ICEP2018, Dec. 13-15, 2018, Sydney, Australia, 8 pages.

Mousa et al., "Design of a Hybrid Solar-Wind Power Plant Using Optimization", 2010 Second International Conference on Engineering Systems Management and Its Applications (ICESMA), 7 pages.

Tripanagnostopoulos et al., "Combined Solar and Wind Energy Systems", 7th International Conference of the Balkan Physical Union, Jan. 2010, 7 pages.

Yang et al., "A novel optimization sizing model for hybrid solar-wind power generation system", Solar Energy 81 (2007), Available online Aug. 24, 2006, pp. 76-84.

* cited by examiner

MAXIMIZING SOLAR PANEL POWER GENERATION WITH MICRO WIND TURBINES

BACKGROUND

The present disclosure relates generally to the field of solar panel power generation, and more particularly to maximizing power generation with micro wind turbines.

Maximizing total energy output, often results in solar panels oriented in their mounts to face south (in the Northern Hemisphere) or north (in the Southern Hemisphere) and tilted to allow for the latitude. Accordingly, the tilting of the solar panels results in a difference in elevation, with respect to the surface under the solar panel, between the two opposite ends of a solar panel. When air is passing from a large opening to a small opening, e.g., form the end of the solar panel furthest from the surface under the solar panel to the end of the solar panel closest to surface under the solar panel, the speed of air is increased at the small opening.

Solar panels are installed in a large land area or roof of building. Accordingly, cumulative increased air flow at the small opening of a collection of solar panels will be large. Solar panels are also installed in open area wherein the wind flow rate, and speed of the wind will be greater because of fewer obstructions. The passing of storms can also provide a significant increase in wind speed for the duration of the storm.

Solar farms are capital intensive, e.g., it is estimated that a one megaWatt (MW) solar farm requires an investment of one million dollars. Consequently, solar farms generate power for eight to nine hours a day, e.g., during daylight hours, and remain idle for rest of the day. With the exponential increase in land cost, return on invest of a solar farm is not a very attractive investment anymore. Typically, solar panels are installed in open areas. These open areas can provide a sustained wind flow rate, wherein the speed of wind is not insignificant. A need has arisen to make solar farms more efficient for continued viability, e.g., there is a need to harvest additional renewable energy in combination with the utilization of solar panels.

BRIEF SUMMARY

According to an embodiment of the present invention, a computer-implemented method for adjusting the inclination of a solar panel and the pitch of one or more micro-turbines to maximize power output, the computer-implemented method comprising: predicting wind velocity at a small opening of an inclined solar panel wherein a plurality of micro-turbines are located; predicting solar irradiance striking the inclined solar panel; calculating an optimal solar panel inclination angle and micro-turbine pitch based on maximizing power output; and adjusting the solar panel inclination angle and micro-turbine pitch based on the calculating.

According to an embodiment of the present invention, a system for adjusting the inclination of a solar panel and the pitch of one or more micro-turbines to maximize power output, the system comprising: one or more solar panels; a mounting system for the one or more solar panels; one or more micro-turbines positioned at a small opening end of the one or more solar panels; one or more motors and gears for changing an inclination of the one or more solar panels and a pitch of the one or more micro-turbines; one or more computer processors and memory for executing program instructions; one or more non-transitory computer readable storage media; and program instructions stored on the one or more non-transitory computer readable storage media, the program instructions comprising: program instructions to predict wind velocity at a small opening of an inclined solar panel wherein a plurality of micro-turbines are located; program instructions to predict solar irradiance striking the inclined solar panel; program instructions to calculate an optimal solar panel inclination angle and micro-turbine pitch based on maximizing power output; and program instructions to adjust the solar panel inclination angle and micro-turbine pitch based on the calculating.

According to an embodiment of the present invention, a computer program product for adjusting the inclination of a solar panel and the pitch of one or more micro-turbines to maximize power output, the computer program product comprising: one or more non-transitory computer readable storage media and program instructions stored on the one or more non-transitory computer readable storage media, the program instructions comprising: program instructions to predict wind velocity at a small opening of an inclined solar panel wherein a plurality of micro-turbines are located; program instructions to predict solar irradiance striking the inclined solar panel; program instructions to calculate an optimal solar panel inclination angle and micro-turbine pitch based on maximizing power output; and program instructions to adjust the solar panel inclination angle and micro-turbine pitch based on the calculating.

Other aspects and embodiments of the present invention will become apparent from the following detailed description, which, when taken in conjunction with the drawings, illustrate by way of example the principles of the invention.

DETAILED DESCRIPTION

Figure 1:
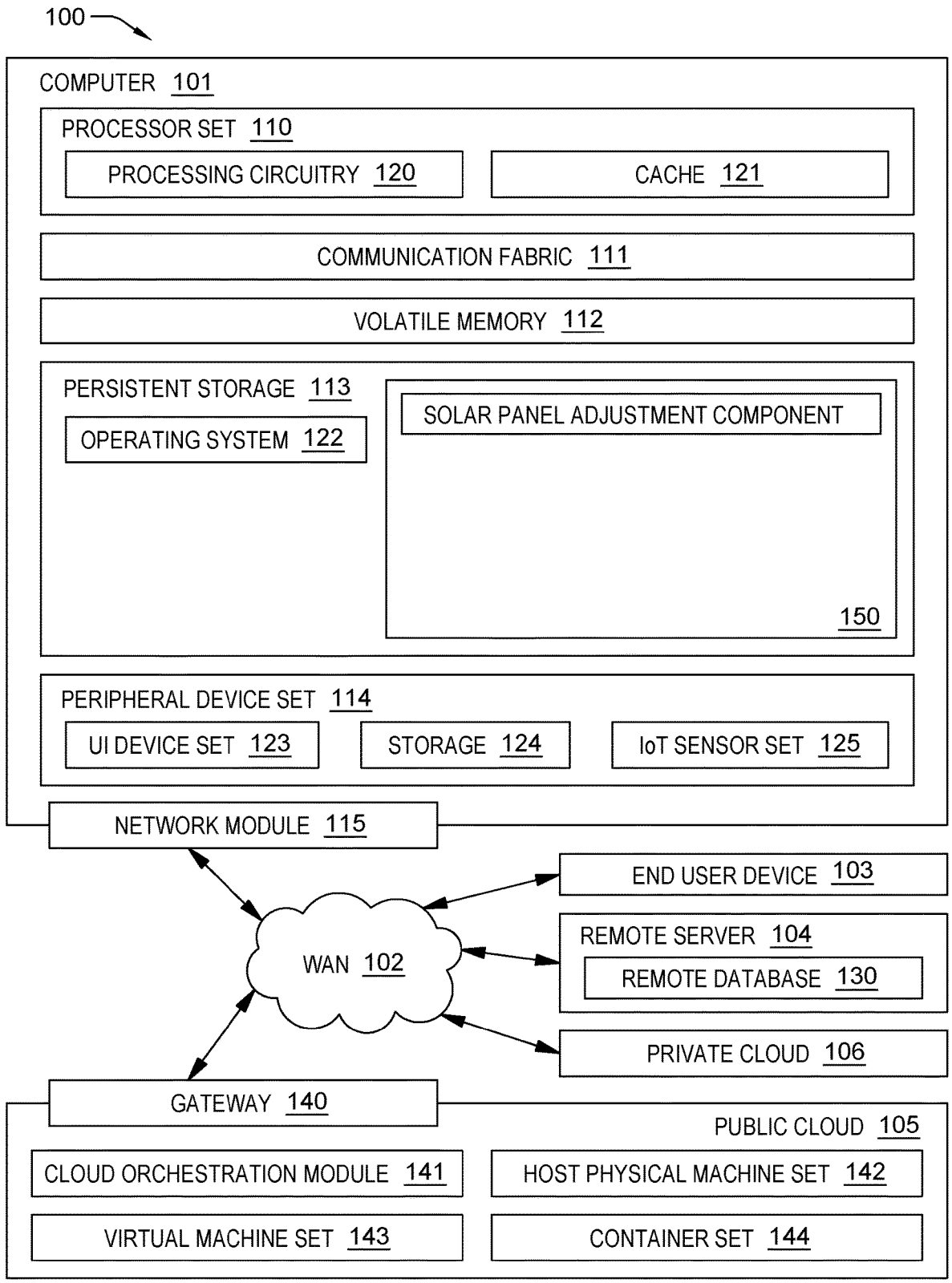
FIG. 1 depicts a cloud computing environment and a high-level architecture, in accordance with at least one embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Solar Panel Adjustment Component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments described herein provide the capability to combine solar panels and micro wind turbines to maximize the energy utilization by placing the micro wind turbines at the small opening exit area of sliding solar panels to recover the wind energy, i.e., increase in air speed at the exiting region for a given constant atmospheric pressure, created by the difference in the size of entry and the exit area of an angle mounted solar panel setup.

Further, a method is disclosed to determine optimal slope angle of a mounted solar panel and a pitch angle of the micro wind turbine for the predicted time horizon to maximize the aggregate power generation, i.e., from solar irradiance and wind power from an increase in air speed at the exit area for a given constant atmospheric pressure, based on the forecasted solar irradiance, wind speed magnitude and direction, pitch controller and solar angle mount controller constraints. It should be noted that a weather forecast can be employed to assist in predicting solar irradiance.

It should be noted that references throughout this specification to features, advantages, or similar language herein do not imply that all the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description, and appended claims, or may be learned by the practice of the invention as set forth hereinafter.

The scope of the present invention is to be determined by the claims. Accordingly, any features, characteristics, advantages, or the like, discussed below in the discussion of embodiments of this specification shall not be taken to mean that such features, characteristics, advantages, or the like are required to practice the present invention as defined by the claims.

Embodiments of the present invention are described with reference to the Figures. It should be noted that although the example embodiments are illustrated as a computer component associated with a computer center, embodiments of the present invention are applicable to any system requiring removable components retained by a manually operated spring-loaded latch.

Figure 2:
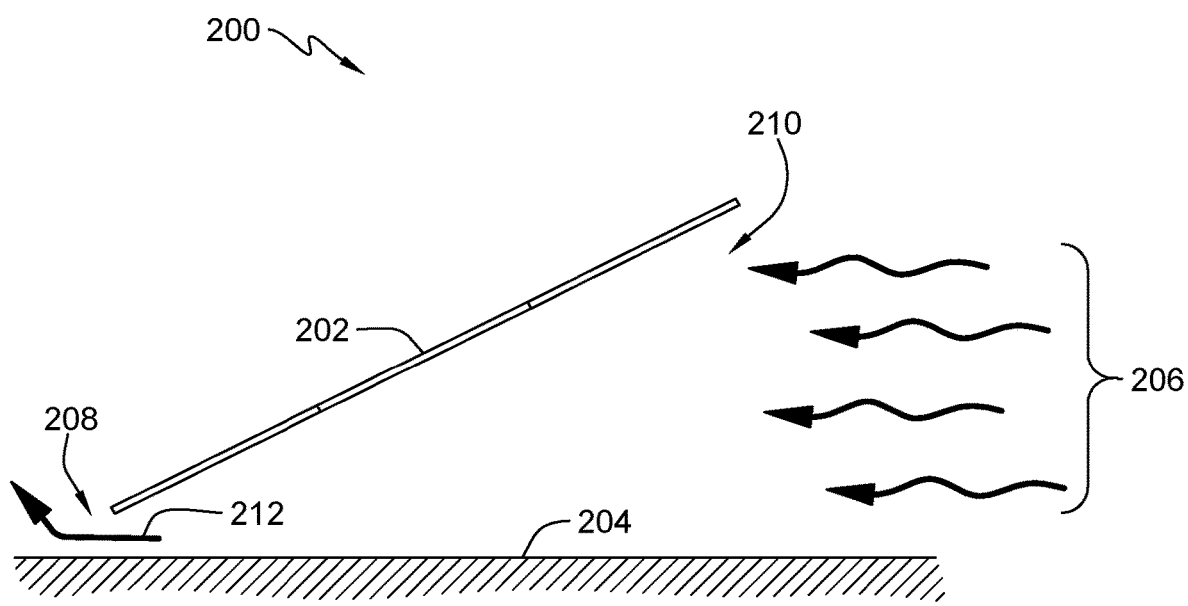
FIG. 2 depicts an inclined solar panel with a small opening and a large opening for funneling wind, in accordance with at least one embodiment of the present invention.

Looking to FIG. 2 is a diagram 200 depicting an embodiment of a solar panel 202 mounted on an incline wherein the incline is appropriate for the latitude of the location where the solar panel 202 is installed. In one aspect of an embodiment of the present invention, based on the incline, the solar panel 202 forms an angle with the base 204 beneath the solar panel 202 creating a small opening 208 on a first end of the solar panel 202 and a large opening 210 on the opposite end of the solar panel 202. It should be noted that the base 204 can be objects such as, but not limited to, a roof on a building, the ground, etc. In another aspect of an embodiment of the present invention, wind entry speed 206 can enter the large opening 210 associated with the solar panel 202 and the base 204 and exit through the small opening 208 associated with the solar panel 202 and the base 204.

Considering one aspect of an embodiment of the present invention, a constant atmospheric pressure, the difference in area between the wind entry position at the large opening 210 and the wind exit position at the small opening 208 creates a difference in force based on the equation Force (F)=Pressure (P)×Area (A). The area at the small opening 208 exit of a mounted solar panel is less than the area at the large opening 210 entry. When air is passing from a large opening 210 to a small opening 208, the wind exit speed 212 is increased at the small opening 208 with respect to the wind entry speed 206 at the large opening 210.

In another aspect of an embodiment of the present invention, by placing one or more micro-turbines at the small opening 208 exit portion of the angle mounted solar panel, wind energy can be extracted based on dynamically changing the panel angle. It should be noted that the one or more micro-turbines (see FIG. 3) can be attached to the mounted solar panels 202. Accordingly, during the day a solar panel can generate power from solar radiation and can also recover power from the wind flow at the small opening 208, i.e., the sliding edge. In another aspect of an embodiment of the present invention, during the night, i.e., non-solar producing times, additional power can be generated based on operation of the one or more micro-turbines.

Figure 3:
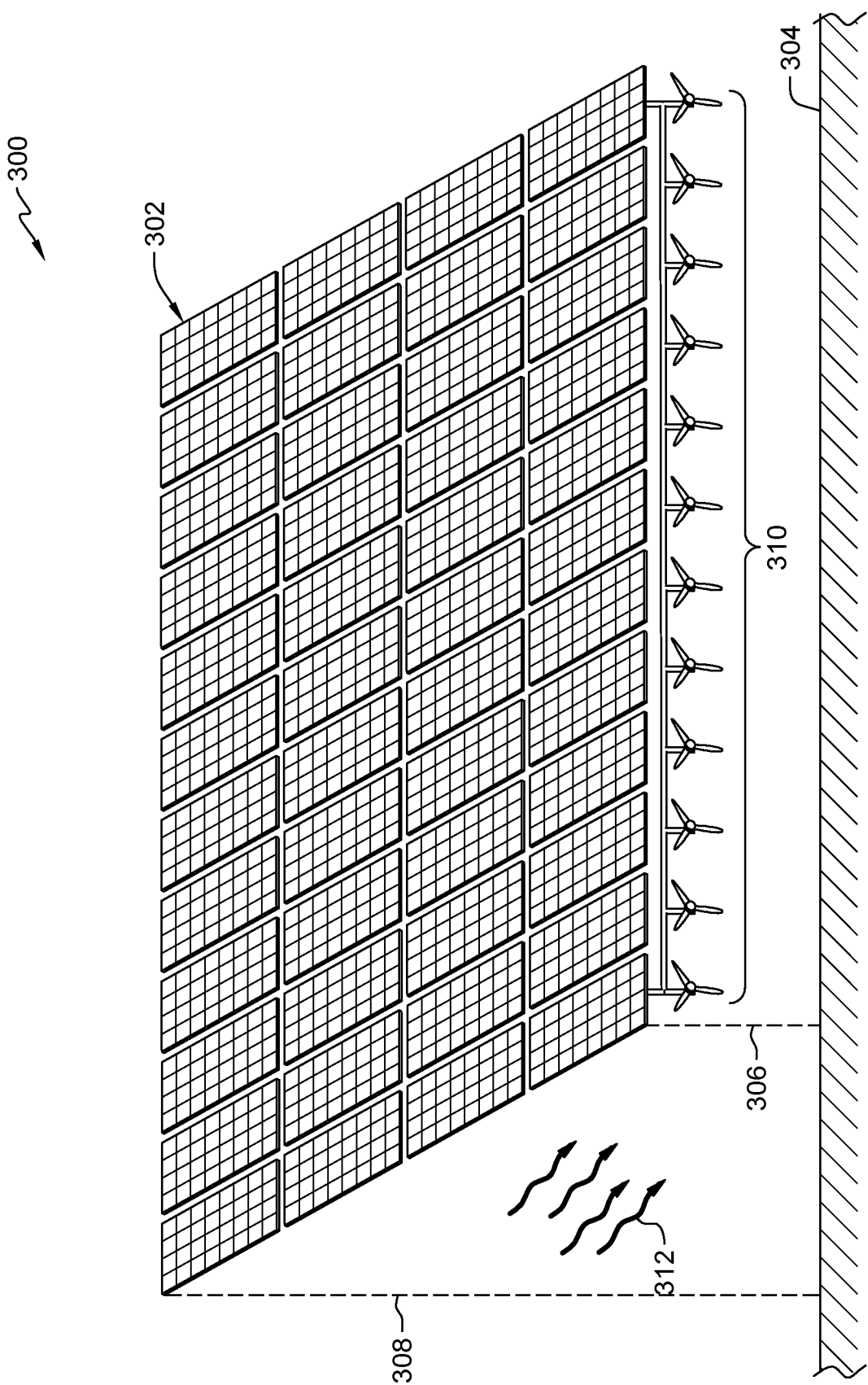
FIG. 3 depicts a plurality of solar panels in a mount with a plurality of micro-turbines at the small opening, in accordance with at least one embodiment of the present invention.

Turning now to FIG. 3 and diagram 300, another embodiment of a group of solar panels 302 mounted on an incline wherein the incline is appropriate for the latitude of the location where the group of solar panels 302 are installed is presented as an example. In one aspect of the example the size of the solar panels 302 is eighteen meters by eight meters. The small opening 306 between the solar panels 302 and the ground 304 is 1 meter (m). In another aspect of the example, the large opening 308 between the solar panels 302 and the ground 304, based on a 45° inclination of the solar panels 302 is 5.6 meters. Accordingly, assuming a wind speed 312 of 2 meters per second (m/s), the change in wind speed 312 based on the funneling effect of the inclined solar panels 302 is calculated based on the equation wind speed 312 (WS)=2 m/s×(5.6 m+1 m)/1 m=13.2 m/s. In another aspect of the example, placing 8 micro-turbines (MT) 310, wherein the micro-turbines 310 have 830 millimeter (mm) rotors, on the small opening 306 will generate 10 units (8 MT*65 W/MT-hr*24 hours/day*0.8) per day of power. Wherein the "0.8" is a capacity factor, i.e., a ratio of actual power to the maximum power of a micro-turbine. In another aspect of the example, the 48 solar panels (SP) 302, arranged as 4 groups of 12, can generate 72 units (U), e.g., (48 SP) (0.25 kW$_p$/SP) (6 kW/1 kWp day)=72 kW/day. Accordingly, it should be noted that there is a potential to boost the output of the solar panels 302 by approximately 15% with the addition of the micro-turbines.

In another aspect of an embodiment of the present invention, control of solar panel inclination can be precise and can be subject to small step changes in inclination while considering the entire prediction horizon. For example, at different inclination angles, the next angle should be chosen such that it is optimal for a predetermined number of inclination angles, based on the frequency of change in wind direction.

Looking again to an embodiment of a group of solar panels 302 mounted on an incline wherein the incline is appropriate for the latitude of the location where the group of solar panels 302 are installed is presented. In one aspect of an embodiment of the present invention, an algorithm is described that can predict a horizon optimization for the solar panels 302. In another aspect of an embodiment of the present invention, the algorithm can predict the wind velocity and direction at the solar panels 302 based on factors including, but not limited to, the latitude and longitude of the solar panels 302 installation and the layout of the solar panels 302 mounting system. It should be noted that the layout can include factors such as, but not limited to, the orientation of the mounting system with respect to the wind direction, obstructions positioned at or near the mounting system, etc.

Figure 4:
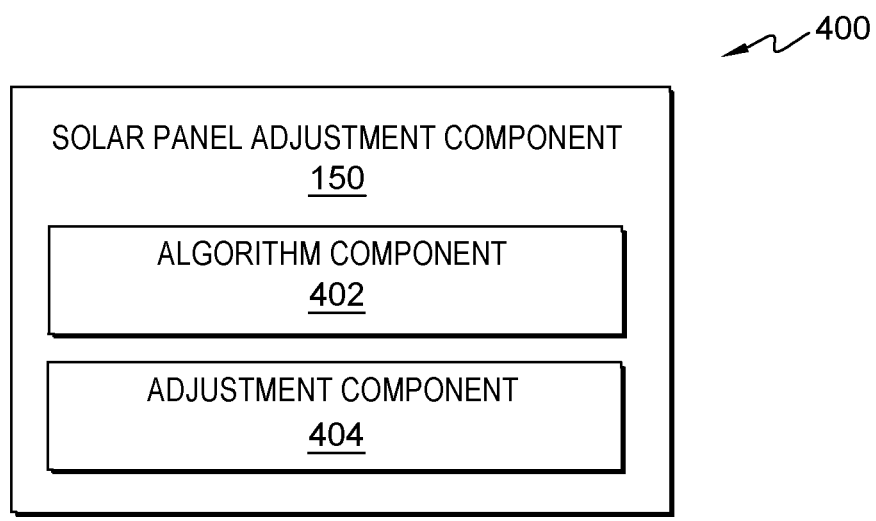
FIG. 4 depicts an exemplary detailed architecture, in accordance with at least one embodiment of the present invention.
Figure 5:
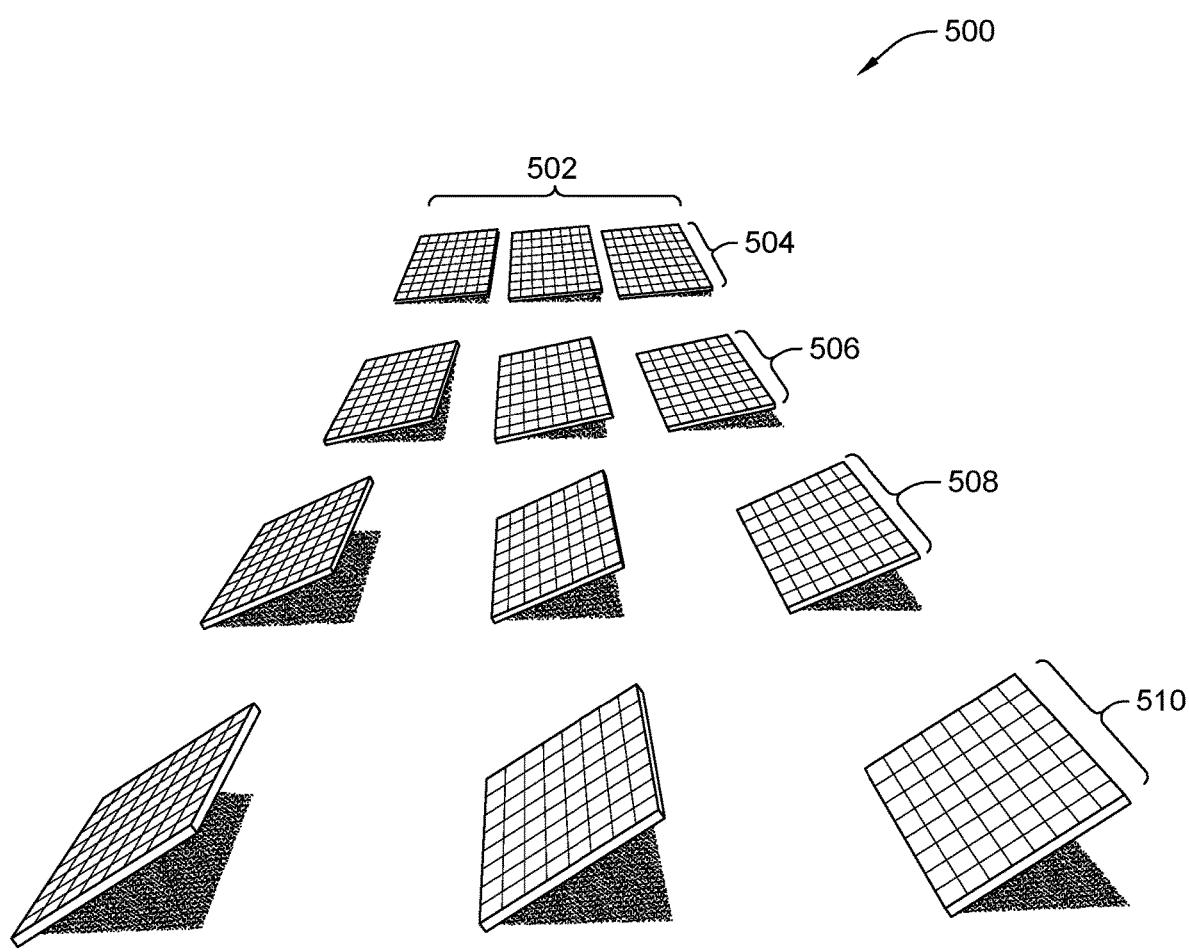
FIG. 5 depicts a plurality of solar panels in a mount with a plurality of micro-turbines at different inclinations and different ground coverage ratios, in accordance with at least one embodiment of the present invention.
Figure 6:
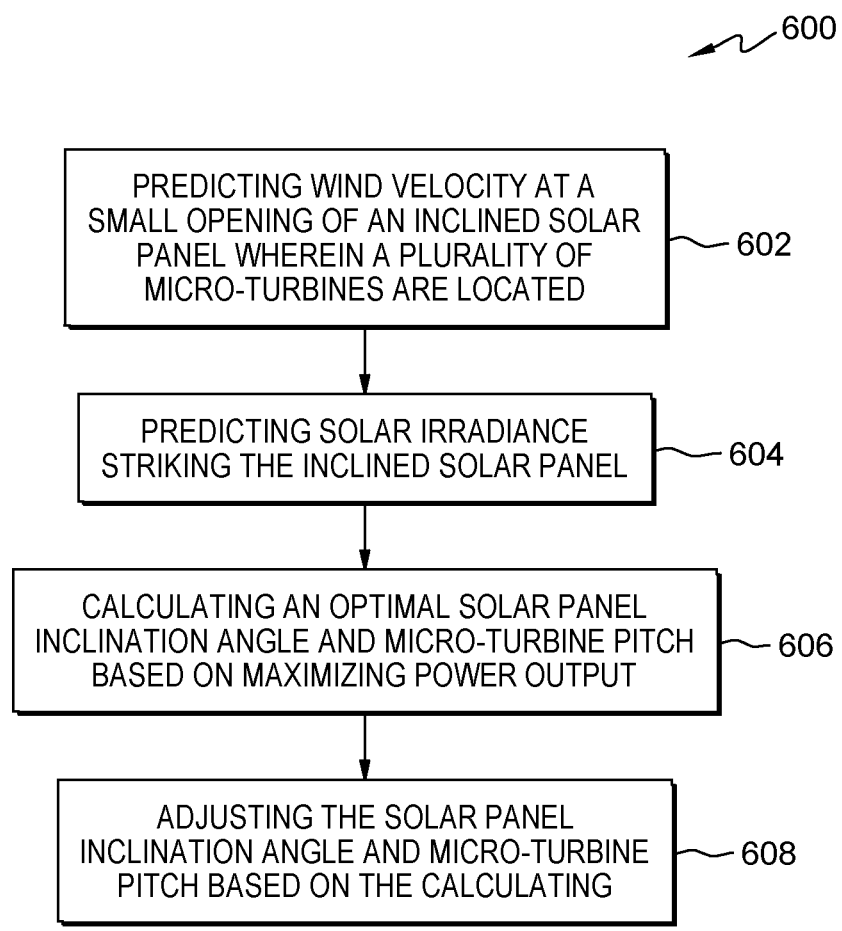
FIG. 6 is a flowchart of a method for adjusting the inclination of a solar panel and the pitch of one or more micro-turbines to maximize power output, in accordance with at least one embodiment of the present invention.

FIG. 4 is an exemplary detailed architecture for performing various operations of FIG. 6, in accordance with various embodiments. The architecture 400 may be implemented in accordance with the present invention in any of the environments depicted in FIGS. 1-3 and 5-6, among others, in various embodiments. Of course, more or less elements than those specifically described in FIG. 4 may be included in architecture 400, as would be understood by one of skill in the art upon reading the present descriptions.

Architecture 400 provides a detailed view of at least some of the modules of diagram 300. Architecture 400 can comprise a solar panel adjustment component 150, which can further comprise algorithm component 402 and adjustment component 404.

Looking now to FIG. 4 and another aspect of an embodiment of the present invention, algorithm component 402 can include, but is not limited to an algorithm that can combine the solar radiance and the predicted and measured wind velocity at the solar panels 302 to perform a joint optimization, e.g., solar and wind, to update both the slope of the solar panels 302 and the pitch angles of the micro-turbines 310 based on the algorithm:

$$J = \sum_{i=1}^{N} w_{H_i}(W_i^r - W_i^m)^2 + \sum_{i=1}^{N} w_{L_i}(L_i^r - L)^2 + \sum_{i=1}^{N} w_{uH_i}(\Delta u)^2 + \sum_{i=1}^{N} w_{vL_i}(\Delta v)^2$$

wherein J is the cost function over the receding horizon; $W_i^r$ is the optimal wind speed for the instant 'i' from the knowledge base; $W_i^m$ is the chosen wind speed for the instant 'i;' $L_i^r$ is the available irradiance for the instant 'i' from the knowledge base; $L_i^m$ is the captured irradiance for the instant 'i;' u, v is the wind and irradiance controller variable, respectively; $w_{H_i}$, $w_{L_i}$ are the weighting coefficients for wind angle and irradiance, respectively; $w_{uH_i}$, $w_{uL_i}$ are the penalizing coefficients for big changes in wind angle and irradiance in the controller, respectively; and $H^{max}$, $L^{max}$ are the maximum limits for wind speed and irradiance level, respectively. It should be noted that the receding horizon cost function is subject to the constraints $0 \leq W_i^m \leq W^{max}$ and $0 \leq L_i^m \leq L^{max}$ for selected wind speed and the captured irradiance.

In another aspect of an embodiment of the present invention, adjustment component 404 can be incorporated into a control system suitable for controlling the incline of the solar panels 302 and the pitch angles of the micro-turbines 310. The adjustment component 404 can direct outputs associated with the control system to adjust the solar panels 302 inclination and the micro-turbines 310 pitch angles, based on the output from the algorithm, to optimize the power production of the solar panels 302 and micro-turbines 310 combination.

Turning now to FIG. 5 and another aspect of an embodiment 500 of the present invention, the receding horizon cost function can provide the capability to adjust the inclination angle of solar panels 502, e.g., 5° tilt for solar panel group 504, 10° tilt for solar panel group 506, 20° tilt for solar panel group 508 and 30° tilt for solar panel group 510, within the constraints of the ground coverage ratio (GCR) associated with the solar panels 502 mounting system, e.g., 0.85 GCR for solar panel group 504, 0.70 GCR for solar panel group 506, 0.60 GCR for solar panel group 508 and 0.50 GCR for solar panel group 510, based on optimizing the output of the combined power of the solar panels 502 and the micro-turbines 310. It should be noted that the smaller the GCR the greater the allowable incline angle without shading adjacent solar panels 302.

FIG. 6 is an exemplary flowchart of a method 600 for adjusting the inclination of a solar panel and the pitch of one or more micro-turbines to maximize power output. At step 602, an embodiment can predict wind velocity at a small opening of an inclined solar panel wherein a plurality of micro-turbines is located. At step 604, the embodiment can predict solar irradiance striking the inclined solar panel. At step 606, the embodiment can calculate an optimal solar panel inclination angle and micro-turbine pitch based on maximizing power output. At step 608, the embodiment can adjust the solar panel inclination angle and micro-turbine pitch based on the calculating.

What is claimed is:

1. A computer-implemented method for adjusting an inclination angle of a solar panel and a pitch of one or more micro-turbines to maximize power output, the computer-implemented method comprising:
    predicting wind velocity at a small opening of an inclined solar panel wherein the one or more micro-turbines are located;
    predicting solar irradiance striking the inclined solar panel;
    calculating an optimal solar panel inclination angle and an optimal pitch of the one or more micro-turbines based on maximizing power output; and
    adjusting the solar panel inclination angle and the pitch of the one or more micro-turbines based on the optimal solar panel inclination angle and the optimal pitch of the one or more micro-turbines.

2. The computer-implemented method of claim 1, wherein the calculating is based on an equation:

$$J = \sum_{i=1}^{N} w_{H_i}(W_i^r - W_i^m)^2 + \sum_{i=1}^{N} w_{L_i}(L_i^r - L)^2 + \sum_{i=1}^{N} w_{uH_i}(\Delta u)^2 + \sum_{i=1}^{N} w_{vL_i}(\Delta v)^2,$$

wherein J is a cost function over a receding horizon; $W_i^r$ is optimal wind speed for an instant 'i' from a knowledge base; $W_i^m$ is a chosen wind speed for the instant 'i;' $L_i^r$ is an available irradiance for the instant 'i' from the knowledge base; $L_i^m$ is a captured irradiance for the instant 'i;' u, v is a wind and irradiance controller variable, respectively; $w_{H_i}$, $w_{L_i}$ are weighting coefficients for wind angle and irradiance, respectively; $w_{uH_i}$, $w_{uL_i}$ are penalizing coefficients for big changes in wind angle and irradiance in a controller, respectively; $H^{max}$, $L^{max}$ are maximum limits for wind speed and irradiance level, respectively; and the receding horizon cost function is subject to constraints $0 \leq W_i^m \leq W^{max}$ and $0 \leq L_i^m \leq L^{max}$ for a selected wind speed and a captured irradiance.

3. The computer-implemented method of claim 1, wherein the calculating is performed on a predetermined time interval.

4. The computer-implemented method of claim 1, wherein the adjusting the solar panel inclination angle and micro-turbine pitch is constrained to a predetermined maximum change in angle.

5. The computer-implemented method of claim 4, wherein the adjusting the solar panel inclination angle and micro-turbine pitch is based on an optimal angle for a predetermined number of adjacent maximum changes in angle.

6. The computer-implemented method of claim 1, wherein the predicting the wind velocity is based on a latitude and longitude associated with a location of the inclined solar panel and a measured wind velocity and direction.

7. The computer-implemented method of claim 1, wherein the adjusting is performed dynamically.

8. The computer-implemented method of claim 1, wherein a predicted wind velocity is based on a constant atmospheric pressure.

9. The computer-implemented method of claim 1, wherein the predicting solar irradiance is based on a weather forecast for a latitude and longitude associated with a location of the inclined solar panel.

10. A system for adjusting an inclination angle of a solar panel and a pitch of one or more micro-turbines to maximize power output, the system comprising:
one or more solar panels;
a mounting system for the one or more solar panels;
one or more micro-turbines positioned at a small opening end of the one or more solar panels;
one or more motors and gears for changing a solar panel inclination angle of the one or more solar panels and a pitch of the one or more micro-turbines;
one or more computer processors and memory for executing program instructions;
one or more non-transitory computer readable storage media; and
program instructions stored on the one or more non-transitory computer readable storage media, the program instructions comprising:
program instructions to predict wind velocity at a small opening of an inclined solar panel wherein the one or more of micro-turbines are located;
program instructions to predict solar irradiance striking the inclined solar panel;
program instructions to calculate an optimal solar panel inclination angle and an optimal micro-turbine pitch based on maximizing power output; and
program instructions to adjust the solar panel inclination angle and the pitch of the one or more micro-turbines based on the optimal solar panel inclination angle and the optimal micro-turbine pitch.

11. The system of claim 10, wherein the program instructions to calculate are based on an equation:

$$J = \sum_{i=1}^{N} w_{H_i}(W_i^r - W_i^m)^2 + \sum_{i=1}^{N} w_{L_i}(L_i^r - L)^2 + \sum_{i=1}^{N} w_{uH_i}(\Delta u)^2 + \sum_{i=1}^{N} w_{vL_i}(\Delta v)^2,$$

wherein J is a cost function over a receding horizon; $W_i^r$ is optimal wind speed for an instant 'i' from a knowledge base; $W_i^m$ is a chosen wind speed for the instant 'i;' $L_i^r$ is an available irradiance for the instant 'i' from the knowledge base; $L_i^m$ is a captured irradiance for the instant 'i;' u, v is a wind and irradiance controller variable, respectively; $W_{H_i}$, $w_{L_i}$ are weighting coefficients for wind angle and irradiance, respectively; $w_{uH_i}$, $w_{uL_i}$ are penalizing coefficients for big changes in wind angle and irradiance in a controller, respectively; $H^{max}$, $L^{max}$ are maximum limits for wind speed and irradiance level, respectively; and the receding horizon cost function is subject to constraints $0 \leq W_i^m \leq W^{max}$ and $0 \leq L_i^m \leq L^{max}$ for a selected wind speed and a captured irradiance.

12. The system of claim 10, wherein the program instructions to calculate are performed on a predetermined time interval.

13. The system of claim 10, wherein the program instructions to adjust the solar panel inclination angle and micro-turbine pitch are constrained to a predetermined maximum change in angle.

14. The system of claim 13, wherein the program instructions to adjust the solar panel inclination angle and micro-turbine pitch are based on an optimal angle for a predetermined number of adjacent maximum changes in angle.

15. The system of claim 10, wherein the program instructions to predict the wind velocity are based on a latitude and longitude associated with a location of the inclined solar panel and a measured wind velocity and direction.

16. The system of claim 10, wherein the program instructions to adjust are performed dynamically.

17. The system of claim 10, wherein the program instructions to predict the wind velocity are based on a constant atmospheric pressure.

18. The system of claim 10, wherein the program instructions to predict the solar irradiance are based on a weather forecast from a latitude and longitude associated with a location of the inclined solar panel.

19. A computer program product for adjusting an inclination angle of a solar panel and a pitch of one or more micro-turbines to maximize power output, the computer program product comprising:

one or more non-transitory computer readable storage media and program instructions stored on the one or more non-transitory computer readable storage media, the program instructions comprising:

program instructions to predict wind velocity at a small opening of an inclined solar panel wherein one or more micro-turbines are located;

program instructions to predict solar irradiance striking the inclined solar panel;

program instructions to calculate an optimal solar panel inclination angle and an optimal micro-turbine pitch based on maximizing power output; and program instructions to adjust the solar panel inclination angle and micro-turbine pitch based on the optimal solar panel inclination angle and the optimal micro-turbine pitch.

20. The computer program product of claim 19, wherein the program instructions to calculate are based on an equation:

$$J = \sum_{i=1}^{N} w_{H_i}(W_i^r - W_i^m)^2 + \sum_{i=1}^{N} w_{L_i}(L_i^r - L)^2 + \sum_{i=1}^{N} w_{uH_i}(\Delta u)^2 + \sum_{i=1}^{N} w_{vL_i}(\Delta v)^2,$$

wherein J is a cost function over a receding horizon; $W_i^r$ is optimal wind speed for an instant 'i' from a knowledge base; $W_i^m$ is a chosen wind speed for the instant 'i;' $L_i^r$ is an available irradiance for the instant 'i' from the knowledge base; $L_i^m$ is a captured irradiance for the instant 'i;' u, v is a wind and irradiance controller variable, respectively; $w_{H_i}$, $w_{L_i}$ are weighting coefficients for wind angle and irradiance, respectively; $w_{uH_i}$, $w_{uL_i}$ are penalizing coefficients for big changes in wind angle and irradiance in a controller, respectively; $H^{max}$, $L^{max}$ are maximum limits for wind speed and irradiance level, respectively; and the receding horizon cost function is subject to constraints $0 \leq W_i^m \leq W^{max}$ and $0 \leq L_i^m \leq L^{max}$ for a selected wind speed and a captured irradiance.

* * * * *